(12) United States Patent
Jang et al.

(10) Patent No.: US 10,488,703 B2
(45) Date of Patent: Nov. 26, 2019

(54) DISPLAY APPARATUS

(71) Applicant: SAMSUNG ELECTRONICS CO., LTD., Suwon-si (KR)

(72) Inventors: Nae-Won Jang, Seongnam-si (KR); Young Chol Lee, Hwaseong-si (KR); Byoung-Jin Cho, Anyang-si (KR); Wook-Jae Jeon, Hwaseong-si (KR); Seung Hun Chae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/704,165

(22) Filed: Sep. 14, 2017

(65) Prior Publication Data

US 2018/0088413 A1    Mar. 29, 2018

(30) Foreign Application Priority Data

Sep. 28, 2016    (KR) .................. 10-2016-0124561

(51) Int. Cl.
   *G02F 1/1335*    (2006.01)
   *G02F 1/1343*    (2006.01)
   *G02B 5/20*    (2006.01)

(52) U.S. Cl.
   CPC ......... *G02F 1/133602* (2013.01); *G02B 5/20* (2013.01); *G02F 1/1343* (2013.01); *G02F 1/133509* (2013.01); *G02F 1/133514* (2013.01); *G02F 2001/133562* (2013.01); *G02F 2201/08* (2013.01); *G02F 2202/022* (2013.01); *G02F 2203/055* (2013.01)

(58) Field of Classification Search
   CPC ......... G02F 1/133502; G02F 1/133509; G02F 1/133514; G02F 1/133603; G02F 2001/133562; G02F 2001/133614; G02F 2001/133521; G02F 2201/08; G02F 2202/022; G02F 2203/055; G02F 1/133528; G02F 2001/133548; G02B 5/28; G02B 5/30; G02B 5/305; G02B 5/3058
   See application file for complete search history.

(56) References Cited

U.S. PATENT DOCUMENTS

2005/0105902 A1    5/2005    Alavie et al.
2009/0002620 A1*   1/2009    Yamashita .......... C08F 297/026
                                                    349/137
(Continued)

FOREIGN PATENT DOCUMENTS

WO    2016056716 A1    4/2016

OTHER PUBLICATIONS

Communication dated Feb. 15, 2018, from the European Patent Office in counterpart European Application No. 17191432.8.

*Primary Examiner* — Angela K Davison
(74) *Attorney, Agent, or Firm* — Sughrue Mion, PLLC

(57) ABSTRACT

A display apparatus having enhanced color reproduction, and a display apparatus including a light absorption sheet that absorbs light having a wavelength corresponding to yellow light and/or orange light in the light are provided. The display apparatus includes: a backlight unit; a liquid crystal panel configured to selectively block light emitted from the backlight according to an electric field; and a light absorption sheet disposed on a front side of the liquid crystal panel for absorbing light having a predetermined range of wavelength.

20 Claims, 14 Drawing Sheets

(56) References Cited

U.S. PATENT DOCUMENTS

| | | | |
|---|---|---|---|
| 2013/0063683 A1* | 3/2013 | Lin .................. | G02F 1/133514 |
| | | | 349/68 |
| 2013/0286358 A1* | 10/2013 | Takahashi ............ | G02B 5/3058 |
| | | | 353/20 |
| 2014/0160408 A1* | 6/2014 | Cho .................. | G02F 1/133617 |
| | | | 349/110 |
| 2018/0081096 A1* | 3/2018 | Claes ................ | G02F 1/133514 |

* cited by examiner

DISPLAY APPARATUS

CROSS-REFERENCE TO RELATED APPLICATION

This application claims priority from Korean Patent Application No. 10-2016-0124561, filed on Sep. 28, 2016 in the Korean Intellectual Property Office, the disclosure of which is incorporated by reference in its entirety.

BACKGROUND

1. Field

Methods and apparatuses consistent with exemplary embodiments relate to a display apparatus.

2. Related Art

A display apparatus converts acquired or stored information to visual information and displays the visual information, and is widely used in various application fields such as homes or places of business.

The display apparatus may be a monitor connected to a personal computer or server computer, a portable computer device, a navigation device, a conventional television (TV), an Internet Protocol television (IPTV), a smart phone, a tablet PC, a personal digital assistant (PDA), a portable terminal such as a cellular phones, any of various display apparatuses used to reproduce advertisements or movies, or any kind of audio/video system.

The display apparatus may display a still image or a moving image to the user by means of various types of display types. Examples of the various display types include cathode ray tubes (CRTs), Light Emitting Diodes (LEDs), Organic Light Emitting Diodes (OLEDs), Active-Matrix Organic Light Emitting Diode (AMOLED), liquid crystal displays (LCDs), e-paper, and the like.

SUMMARY

One or more exemplary embodiments may provide a display apparatus having enhanced color reproduction.

One or more exemplary embodiments may also provide a display apparatus including a light absorption sheet that absorbs light having a wavelength corresponding to yellow and/or orange in the light spectrum.

According to an aspect of an exemplary embodiment, there is provided a display apparatus including: a backlight; a liquid crystal panel configured to selectively block light emitted from the backlight according to an electric field; and a light absorption sheet disposed on a front side of the liquid crystal panel and configured to absorb light having a predetermined range of wavelength.

The predetermined range of wavelength may correspond to yellow light or orange light.

The light absorption sheet may include tetra-aza-porphyrin (TAP), and the predetermined range of wavelength may be 530 nm to 630 nm.

The liquid crystal panel may include: a liquid crystal layer; and a color filter disposed on a front side of the liquid crystal layer, and comprising a red filter, a green filter, a blue filter, and a black matrix interposed between the red filter, the green filter, and the blue filter.

The light absorption sheet may be disposed on at least one side of the black matrix.

The light absorption sheet may be disposed at a position corresponding to the black matrix on the front side of the liquid crystal panel.

The light absorption sheet may include a higher concentration of tetra-aza-porphyrin (TAP) in a portion corresponding to the black matrix than in other portions.

The display apparatus may further include a first polarizing film disposed on a front side of the light absorption sheet.

The display apparatus may further include a second polarizing film disposed on a rear side of the liquid crystal panel, upon which the light emitted from the backlight is incident.

According to an aspect of another exemplary embodiment, there is provided a display apparatus including: a backlight; and a liquid crystal panel configured to selectively block light emitted from the backlight according to an electric field. The liquid crystal panel includes: a color filter including a red filter, a green filter, a blue filter, and a black matrix interposed between the red filter, the green filter, and the blue filter; and a light absorption sheet disposed on at least one side of the black matrix, and configured to absorb light having a predetermined range of wavelength.

The predetermined range of wavelength may correspond to yellow light or orange light.

The light absorption sheet may include tetra-aza-porphyrin (TAP), and the predetermined range of wavelength may be 530 nm to 630 nm.

The light absorption sheet may be disposed on a front side of the liquid crystal panel.

The light absorption sheet may be disposed at a position corresponding to the black matrix on the front side of the liquid crystal panel.

The light absorption sheet may include a higher concentration of tetra-aza-porphyrin (TAP) in a portion corresponding to the black matrix than in other portions.

The display apparatus may further include a first polarizing film disposed on a front side of the liquid crystal panel.

The display apparatus may further include a second polarizing film disposed on a rear side of the liquid crystal panel, upon which the light emitted from the backlight is incident.

BRIEF DESCRIPTION OF THE DRAWINGS

These and/or other aspects will become more apparent and readily appreciated from the following description of exemplary embodiments, taken in conjunction with the accompanying drawings of which.

DETAILED DESCRIPTION

Figure 1:
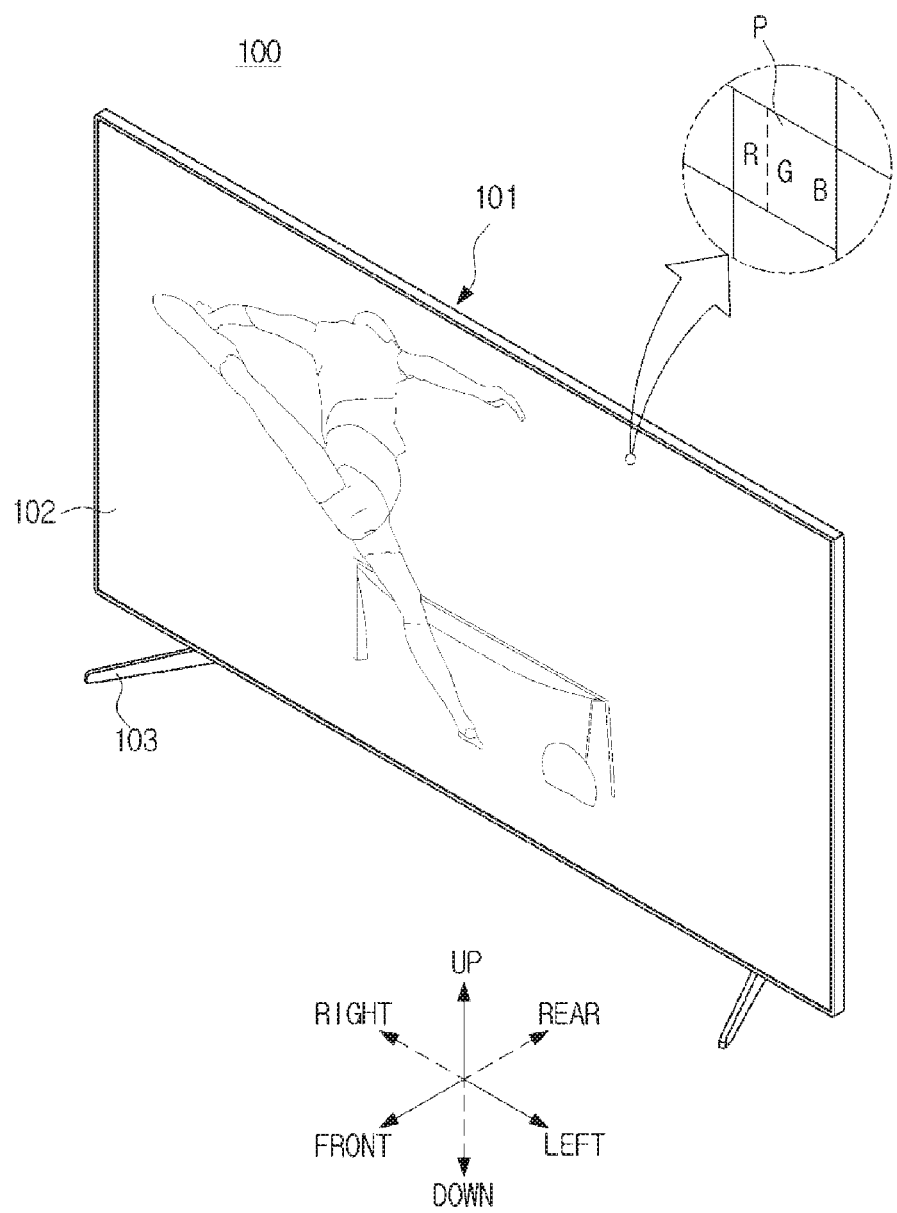
FIG. 1 is a view illustrating an appearance of a display apparatus according to an exemplary embodiment.

Reference will now be made in detail to the exemplary embodiments, aspects of which are illustrated in the accompanying drawings, wherein like reference numerals refer to like elements throughout.

Throughout the specification, the terms used are merely used to describe particular exemplary embodiments, and are not intended to limit the present disclosure.

As used herein, the singular forms "a", "an" and "the" are intended to include the plural forms as well, unless the context clearly indicates otherwise.

Also, it is to be understood that the terms such as "include", "have", or the like, are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It will be understood that the terms "first", "second", and the like, may be used herein to distinguish one element from another.

Expressions such as "at least one of" when preceding a list of elements, modify the entire list of elements and do not modify the individual elements of the list.

In addition, the terms "unit", "device," "block", "member", and "module" used herein refer to a unit used to process at least one function or operation. For example, these terms may refer to one or more hardware components such as field-programmable gate array (FPGA) or application specific integrated circuit (ASIC), one or more software components stored in a memory, or one or more processors.

Hereinafter, exemplary embodiments will be described in detail with reference to the accompanying drawings. In the drawings, like reference numerals will be assigned to like parts or components having substantially same functions.

The terms used throughout the specification are briefly defined as follows: white light refers to a mixture of red, green, and blue light or a mixture of blue and yellow light. Natural light refers to a mixture of all wavelengths of visible light.

FIG. 1 is a view illustrating an appearance of a display apparatus according to an exemplary embodiment.

A display apparatus 100 is an apparatus for processing an image signal received from an external device and visually displaying the processed image. Although a television (TV) is exemplarily described as the display apparatus 100 hereinafter, exemplary embodiments are not limited thereto. For example, the display apparatus 100 may be implemented using various apparatuses such as a monitor, a portable multimedia apparatus, and a portable communication apparatus. Any apparatus for visually representing an image may also be used for the display apparatus 100 without limitation.

As illustrated in FIG. 1, the display apparatus 100 may include a main body 101, a screen 102 configured to display an image I, and a stand 103 disposed under the main body 101 to support the main body 101.

The main body 101 defines an appearance of the display apparatus 100 and may include parts for displaying the image I or performing various functions of the display apparatus 100. Although the main body 101 illustrated in FIG. 1 has a flat shape, the shape of the main body 101 is not limited thereto. For example, the main body 101 may have a curved shape, in which lateral ends thereof protrude forward and the center is curved back.

The screen 102 may be disposed on the front surface of the main body 101 for displaying the image I including visual information. For example, the screen 102 may display a still or moving image, a two-dimensional planar image, or a three-dimensional image using binocular disparity of the user.

Also, the screen 102 may have a plurality of pixels P, and the image I displayed on the screen 102 may be formed by a combination of light emitted from the plurality of pixels P. For example, the still image I may be formed on the screen 102 by combining light emitted from the plurality of pixels P like a mosaic.

Each of the plurality of pixels P may emit light with various colors and luminances. For example, the plurality of pixels P may each include a red pixel R, a green pixel G, and a blue pixel B to form the image I having various colors. The red pixel R may emit red light with various luminances, the green pixel G may emit green light with various luminances, and the blue pixel B may emit blue light with various luminances. The red light has a wavelength in a range from about 620 nano-meter (nm) to about 750 nm, the green light has a wavelength in a range from about 495 nm to about 570 nm, and the blue light has a wavelength in a range about 450 nm to about 495 nm.

Each of the pixels P may generate light having various colors and luminances by combining red light from the red pixel R, green light from the green pixel G, and blue light from the blue pixel B.

The stand 103 may be installed under the main body 101 to support the main body 101 to be stably positioned on the floor. Alternatively, the stand 103 may be installed on the rear surface of the main body 101 to fix the main body 101 to the wall.

Although the stand 103 illustrated in FIG. 1 has a bar shape protruding forward from the lower portion of the main body 101, the shape of the stand 103 is not limited thereto and the stand 103 may have any shape so long as the main body 101 is stably supported by the stand 103.

Figure 2:
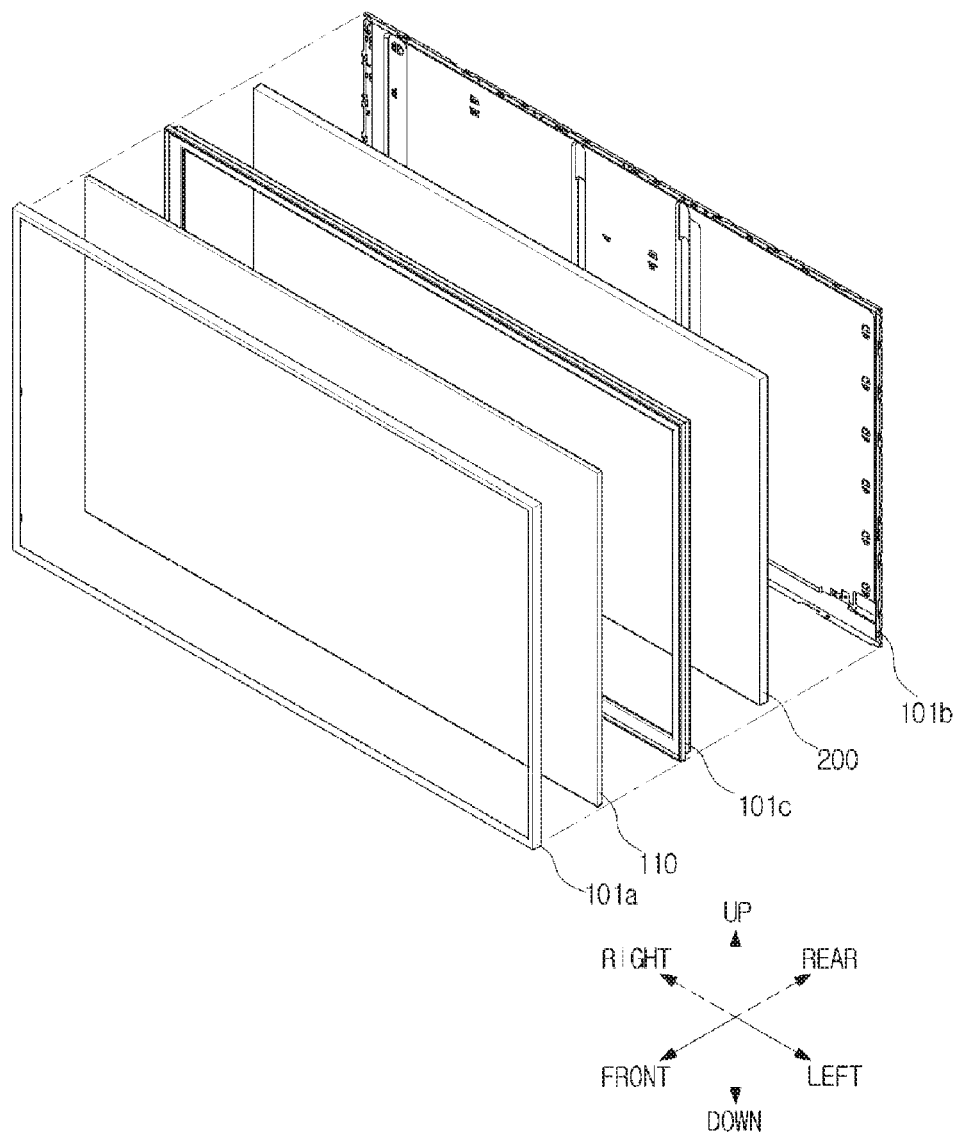
FIG. 2 is an exploded perspective view of a display apparatus according to an exemplary embodiment.

FIG. 2 is an exploded perspective view of a display apparatus according to an exemplary embodiment.

As illustrated in FIG. 2, the main body 101 may include various parts to generate an image I on the screen 102. For example, the main body 101 may include a back light unit 200 configured to emit surface light and an image forming unit 110 configured to generate an image I by transmitting or blocking light emitted from the back light unit 200.

The main body 101 may further include a front chassis 101a, a rear chassis 101b, and a mold frame 101c to fix the image forming unit 110 and the back light unit 200.

The front chassis 101a has the shape of a panel with an opening formed on the front surface of the panel. The user may see the image I generated by the image forming unit 110 through the opening of the front surface of the front chassis 101a.

The rear chassis 101b has the shape of a box with an open front surface and receives the image forming unit 110 and the back light unit 200 constituting the display apparatus 100.

The mold frame 101c may be disposed between the front chassis 101a and the rear chassis 101b. Particularly, the mold frame 101c may be disposed between the image forming unit 110 and the back light unit 200 to fix the image forming unit 110 and the back light unit 200.

The back light unit 200 may include light sources configured to emit monochromatic light or white light and may refract, reflect, or scatter light emitted from the light sources to convert the light into uniform surface light. By refracting, reflecting, and scattering the light emitted from the light sources, the back light unit 200 may emit uniform surface light forward.

Configuration and operation of the back light unit 200 is described in more detail below.

The image forming unit 110 is disposed in front of the back light unit 200 for blocking or transmitting light emitted from the back light unit 200 to form an image I.

The front surface of the image forming unit 110 constitutes the screen 102 of the display apparatus 100 as described above, and includes a plurality of pixels P.

The plurality of pixels P included in the image forming unit 110 may each independently block or transmit light from the back light unit 200 and light passing through the plurality of pixels P forms the image I displayed on the display apparatus 100.

The image forming unit 110 may use a liquid crystal panel having optical properties that vary in accordance with an electric field.

Hereinafter, the liquid crystal panel will be described as an example of the image forming unit 110.

Figure 3:
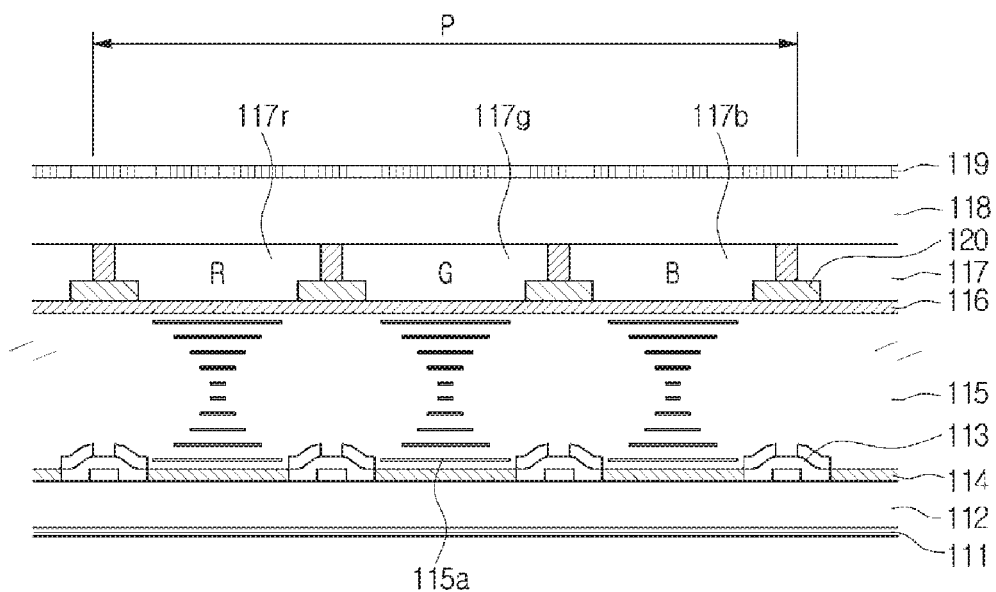
FIG. 3 is a side cross-sectional view of a pixel included in an image forming unit of a display apparatus according to an exemplary embodiment.

FIG. 3 is a side cross-sectional view illustrating a pixel included in an image forming unit of a display apparatus according to an exemplary embodiment.

As illustrated in FIG. 3, the image forming unit 110 may include a first polarizing film 111, a first transparent substrate 112, a thin film transistor (TFT) 113, a pixel electrode 114, a liquid crystal layer 115, a common electrode 116, a color filter 117, a second transparent substrate 118, and a second polarizing film 119. The liquid crystal panel according to the disclosed exemplary embodiment may include the first transparent substrate 112, the thin film transistor 113, the pixel electrode 114, the liquid crystal layer 115, the common electrode 116, the color filter 117, and the second transparent substrate 118.

The first transparent substrate 112 and the second transparent substrate 118 may define an appearance of the image forming unit 110 and protect the liquid crystal layer 115 and the color filter 117 disposed between the first transparent substrate 112 and the second transparent substrate 118. The first and second transparent substrates 112 and 118 may be formed of tempered glass or transparent resin.

The first polarizing film 111 and the second polarizing film 119 are disposed on external surfaces of the first and second transparent substrates 112 and 118, respectively.

Light is made up of a pair of electric and magnetic fields oscillating perpendicularly to the direction of propagation. In addition, the electric and magnetic fields may oscillate in all directions perpendicular to the direction of propagation. In this case, a phenomenon in which the electric field or magnetic field oscillates in a given direction is referred to as polarization, and a film that transmits light having an electric or magnetic field oscillating in the given direction and blocks light having electric and magnetic fields oscillating in other directions than the given direction is referred to as a polarizing film. In other words, the polarizing film transmits light oscillating in a predetermined direction and blocks light oscillating in the other directions.

The first polarizing film 111 may transmit light having electric and magnetic fields oscillating in a first direction and block the other light. Also, the second polarizing film 119 may transmit light having electric and magnetic fields oscillating in a second direction and may block the other light. In this case, the first direction is perpendicular to the second direction. In other words, an oscillating direction of light passing through the first polarizing film 111 is perpendicular to another oscillating direction of light passing through the second polarizing film 119. As a result, light cannot pass both the first polarizing film 111 and the second polarizing film 119.

The color filter 117 may be disposed on the internal surface of the second transparent substrate 11.

The color filter 117 may include a red filter 117r transmitting red light, a green filter 117g transmitting green light, and a blue filter 117b transmitting blue light. The red filter 117r, the green filter 117g, and the blue filter 117b may be aligned parallel to each other. The color filter 117 includes a black matrix that prevents color interference between the red filter 117r, the green filter 117g, and the blue filter 117b and blocks the light from the back light unit from leaking to other portions than the red filter 117r, the green filter 117g, and the blue filter 117b. The black matrix 120 is provided between the red filter 117r, the green filter 117g, and the blue filter 117b.

A region where the color filter 117 is formed corresponds to the pixel P as described above. Furthermore, a region where the red filter 117r is formed corresponds to the red pixel R, a region where the green filter 117g is formed corresponds to the green pixel G, and a region where the blue filter 117b is formed corresponds to the blue pixel B. In other words, the red pixel R, the green pixel G, and the blue pixel B are defined by the red filter 117r, the green filter 117g, and the blue filter 117b, respectively, and a combination of the red filter 117r, the green filter 117g, and the blue filter 117b constitutes the pixel P.

The TFT 113 is disposed on the internal surface of the first transparent substrate 112.

Particularly, the TFT 113 may be disposed at positions corresponding to gaps between the red filter 117r, the green filter 117g, and the blue filter 117b. In other words, the TFTs 113 may be disposed between the red pixel R, the green pixel G, and the blue pixel B.

The TFT 113 may pass or block current flowing to the pixel electrode 114, as will be described later. Specifically, by turning on (closing) or off (opening) the TFT 113, an electric field may be formed or removed from between the pixel electrode 114 and the common electrode 116. The TFT 113 may be formed of poly-silicon, and manufactured by a semiconductor process such as lithography, deposition, and ion implantation.

The pixel electrode 114 may be formed on the first transparent substrate 112 at a more inner position than the TFT 113, and the common electrode 116 is formed on the second transparent substrate 118 at a more inner position than the color filter 117.

The pixel electrode 114 and the common electrode 116 are formed of electrically conductive metallic materials, and may form an electric field to change the alignment of liquid crystal molecules 115a constituting the liquid crystal layer 115, which will be described later.

In this case, the pixel electrode 114 is formed at regions corresponding to the red filter 117r, the green filter 117g, and the blue filter 117b, and the common electrode 116 may be formed on the entire surface of the panel. As a result, electric fields may be formed selectively at the regions corresponding to the red filter 117r, the green filter 117g, and the blue filter 117b in the liquid crystal layer 115.

Also, the pixel electrode 114 and the common electrode 116 are formed of transparent materials and may transmit external light incident thereon. The pixel electrode 114 and the common electrode 116 may be formed of indium tin oxide (ITO), indium zinc oxide (IZO), silver (Ag) nano wire, carbon nano tube (CNT), graphene, poly (3,4-ethylenedioxythiophene) (PEDOT), or the like.

The liquid crystal layer 115 is formed between the pixel electrode 114 and the common electrode 116, and the liquid crystal layer 115 is filled with the liquid crystal molecules 115a.

Liquid crystals are matter in a state which has properties between those of liquids and those of solid (crystals). In general, phase transition from a solid state of a material to a transparent liquid state is observed at a melting point by applying heat thereto. In contrast, heating drives a solid state of a liquid crystal material into an opaque and cloudy liquid state at a melting point of the liquid crystal and then into a transparent liquid state. The term "liquid crystal" also refers to an intermediate phase between a solid phase and a liquid phase or a material having this liquid crystal phase.

Most of the liquid crystal materials are organic compounds and include long rod-shaped molecules. The alignment of molecules thereof may be non-uniform in one direction, but the molecules may have a uniform crystalline structure in another direction. As a result, the liquid crystal has both fluidity of a liquid and optical anisotropy of a crystal (solid).

Also, the liquid crystal may have optical properties that vary in accordance with an electric field. For example, the orientation of liquid crystal molecules constituting the liquid crystal changes in accordance with the electric field. By the electric field formed in the liquid crystal layer 115, the liquid crystal molecules 115a of the liquid crystal layer 115 are aligned in accordance with the orientation of the electric field. If the electric field is not formed in the liquid crystal layer 115, the liquid crystal molecules 115a may be non-uniformly arranged or may be aligned along an alignment layer (not shown).

As a result, optical properties of the image forming unit 110 may vary according to whether or not the electric field of the liquid crystal layer 115 is present.

For example, when the electric field is not formed in the liquid crystal layer 115, light polarized by the first polarizing film 111 may pass the second polarizing film 119 due to the alignment of the liquid crystal molecules 115a of the liquid crystal layer 115. In other words, if the electric field is not formed in the liquid crystal layer 115, the image forming unit 110 may transmit light in the pixel P.

On the other hand, when the electric field is formed in the liquid crystal layer 115, light polarized by the first polarizing film 111 cannot pass through the second polarizing film 119 due to the alignment of the liquid crystal molecules 115a of the liquid crystal layer 115. In other words, light is blocked by the image forming unit 110 in the pixel P if the electric field is formed in the liquid crystal layer 115.

As described above, the image forming unit 110 may control light transmission independently for each pixel P (more particularly, for each of the red, green, and blue pixels included in the pixel P). As a result, lights from the plurality of pixels P may be combined into the image I displayed on the screen 102 of the display apparatus 100.

Hereinafter, the back light unit 200 is described.

The back light units 200 may be classified into direct-type back light units and edge-type back light units according to the position of a light source.

Figure 4:
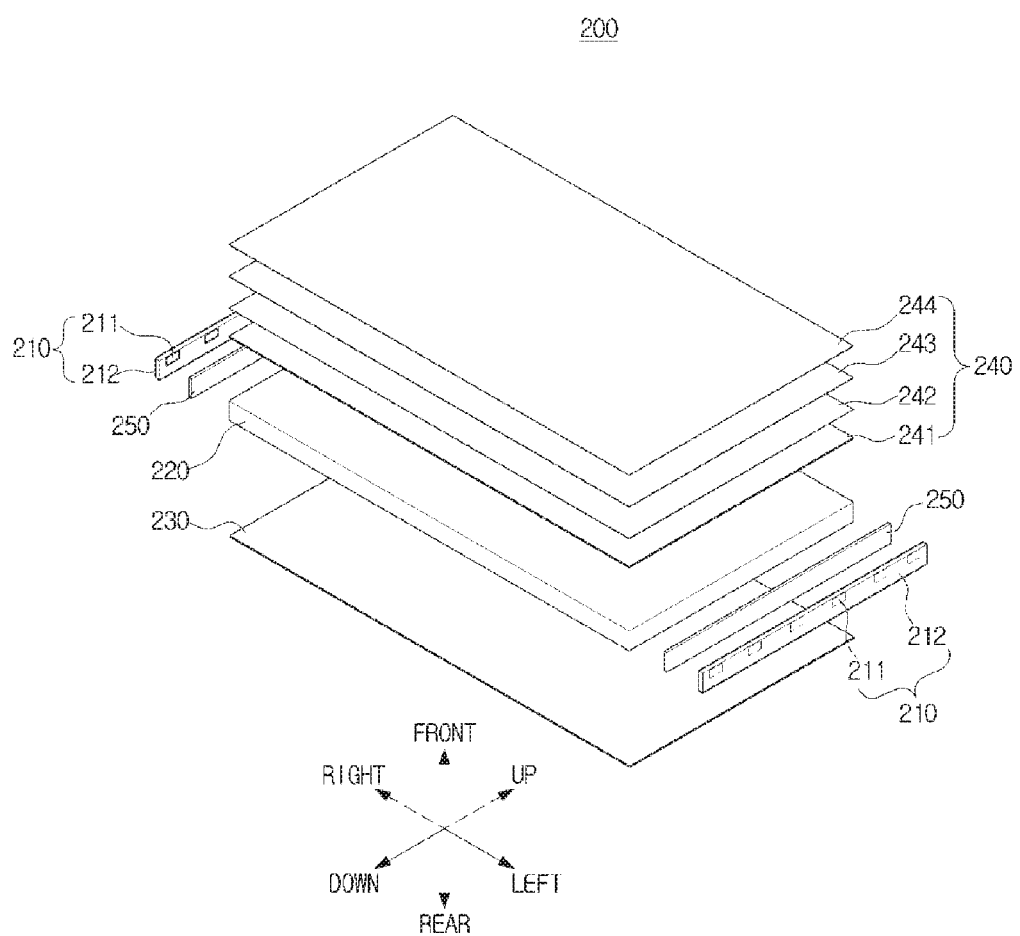
FIG. 4 is an exploded view of a back light unit according to an exemplary embodiment.
Figure 5:
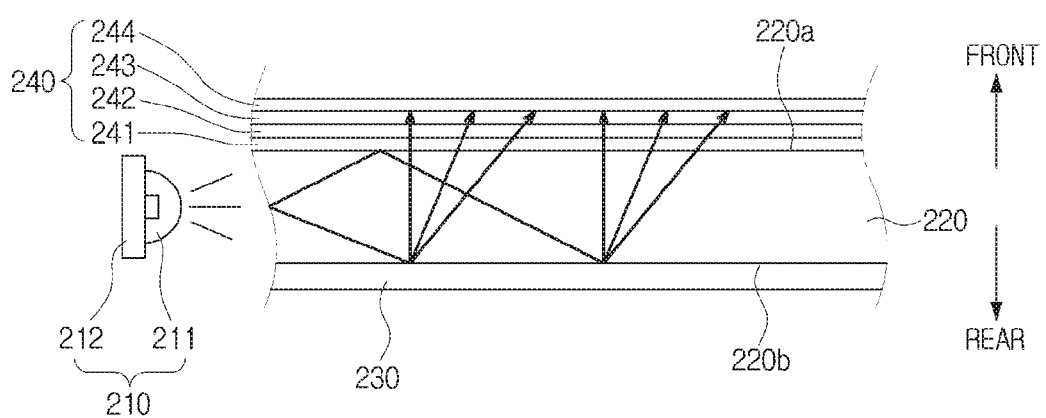
FIG. 5 is a side cross-sectional view of a back light unit according to an exemplary embodiment.
Figure 6:
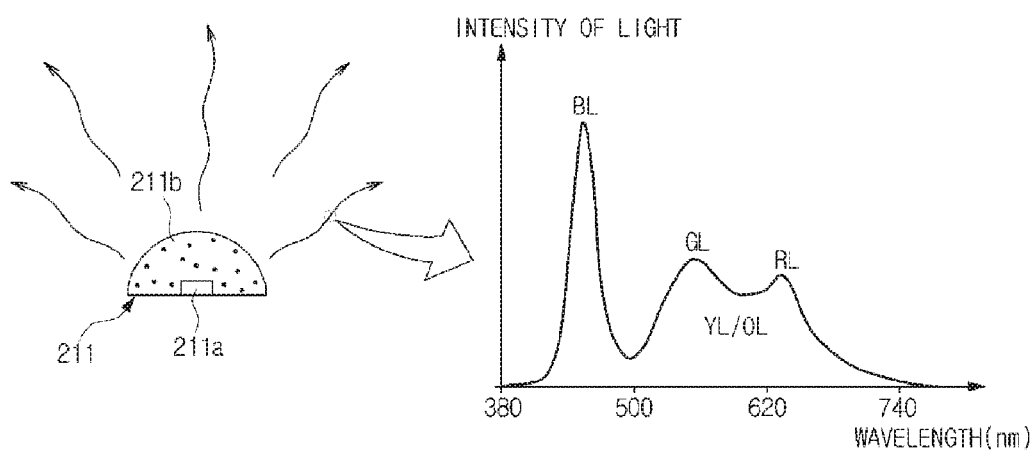
FIG. 6 illustrates the spectrum of light emitted from a light source included in a back light unit according to an exemplary embodiment.

FIG. 4 is an exploded view of a back light unit according to an exemplary embodiment. FIG. 5 is a side cross-sectional view of the back light unit. FIG. 6 is a spectrum of light emitted from a light source included in the back light unit.

Referring to FIGS. 4, 5, and 6, an edge-type back light unit 200 includes a light emitting module 210 configured to generate light, a waveguide plate 220 configured to uniformly diffuse light, a reflection sheet 230 configured to reflect light, and optical sheet 240 configured to improve luminance.

The light emitting module 210 may include a plurality of light sources 211 configured to emit light and a support 212 configured to support and fix the plurality of light sources 211.

The plurality of light sources 211 may be evenly arranged on both sides of the back light unit 200 as illustrated in FIG. 4, and emit light toward the center of the back light unit 200.

The plurality of light sources 211 may be arranged at equal intervals to obtain uniform luminance of the emitted light. For example, the plurality of light sources 211 may be arranged on both left and right sides of the back light unit 200 at equal intervals as illustrated in FIG. 4. However, the arrangement of the light sources 211 is not limited to the arrangement illustrated in FIG. 4. For example, the plurality of light sources 211 may be arranged on one of the left and right sides of the back light unit 200.

The light source 211 may include a device capable of emitting monochromatic light (light of one color, for example, blue light) or white light (combination of various wavelengths) in various directions upon receiving power. For example, the light source 211 may be implemented using a light emitting diode (LED) or a cold cathode fluorescence lamp (CCFL) generating less heat.

For example, the light source 211 may include a blue LED 211a configured to emit high energy blue light, and a phosphor 211b configured to absorb blue light and emit green and red light as illustrated on the left of FIG. 6.

The blue LED 211a of the light source 211 may be manufactured using an indium-gallium-nitrogen compound (InGaN) prepared by adding indium (In) to a gallium-nitrogen compound (GaN).

The phosphor 211b may convert energy absorbed from outside into visible light and emit the visible light. The phosphor 211b may include a yellow phosphor (YAG), a KSF phosphor ($K_2SiF_6$), or a KTF phosphor ($K_2SiF_6$).

The light source 211 may emit blue light BL having a wavelength of about 450 nm, green light GL having a wavelength of about 535 nm, and red light having a wavelength of about 620 nm. However, the light source 211 emits not only the blue light BL, green light GL, and red light RL, but also, as illustrated on the right of FIG. 6, yellow light YL or orange light OL.

The support 212 may fix the plurality of light sources 211 to prevent dislocation of the light sources 211. In addition, the support 212 may supply power to each of the light sources 211 to emit light.

The support 212 may be located at a side of the back light unit 200 together with the light sources 211. For example, as illustrated in FIG. 4, the support 212 may be disposed at both sides of the back light unit 200. However, the positions of the support 212 are not limited thereto, and the support 212 may be disposed at one of the both sides of the back light unit 200. The support 212 may be formed of a synthetic resin provided with conductive power supply lines or a printed circuit board (PCB) to fix the plurality of light sources 211 and supply power to the light sources 211.

The waveguide plate 220 changes the direction of propagation of the incident light from the light emitting module 210 disposed at one side, to emit light forward. Also, the waveguide plate 220 may diffuse incident light from the light emitting module 210 toward a front surface 220a of the waveguide plate 220.

The front surface 220a of the waveguide plate 220 may have a plurality of protruding stripes to change the direction of light propagation, and a rear surface 220b of the waveguide plate 220 may have a plurality of dots. In addition, the size and intervals of the strips or dots may be adjusted to emit uniformly diffused light toward the front surface 220a of the waveguide plate 220. furthermore, the protruding stripes may be embossed on the front surface 220a of the waveguide plate 220 by printing, and the dots may be engraved on the rear surface 220b of the waveguide plate 220 by laser beams.

Since the light emitting module 210 is disposed at sides of the back light unit 200 as described above, luminance may not be uniform due to a position of the light emitting module 210. Thus, the waveguide plate 220 may diffuse light emitted from the light emitting module 210 within the waveguide plate 220 to remove non-uniformity of luminance caused by the position of the light emitting module 210. For example, the waveguide plate 220 may have a milky color to diffuse light.

The light incident into the waveguide plate 220 may proceed in various directions depending on the angle of incidence. For example, as illustrated in FIG. 5, the incident light proceeding toward the front surface 220a of the waveguide plate 220 may be reflected on the front surface 220a to proceed toward the rear surface 220b of the waveguide plate 220 or refracted on the front surface 220a of the waveguide plate 220 to be incident on the optical sheet 240. Also, incident light proceeding toward the rear surface 220b of the waveguide plate 220 may be reflected on the rear surface 220b of the waveguide plate 220 or scattered by the dots formed on the rear surface 220b of the waveguide plate 220 to proceed toward the front surface 220a of the waveguide plate 220.

The light incident on the side surfaces of the waveguide plate 220 may proceed to the center of the waveguide plate 220 via reflection of light occurring on the front surface 220a and the rear surface 220b of the waveguide plate 220. In addition, the light proceeding within the waveguide plate 220 may be emitted through the front surface 220a of the waveguide plate 220 via scattering of light occurring at the rear surface 220b of the waveguide plate 220 and refraction of light occurring at the front surface 220a of the waveguide plate 220.

The waveguide plate 220 may include poly methyl methacrylate (PMMA), transparent polycarbonate (PC), or the like.

The reflection sheet 230 is disposed behind the waveguide plate 220 to reflect light passing through the rear surface 220b of the waveguide plate 220 toward the waveguide plate 220.

The reflection sheet 230 may be manufactured by coating a highly reflective material on a base material. For example, the reflection sheet 230 may be manufactured by coating a polymer having a high reflectivity on a base material of polyethylene terephthalate (PET), or the like.

The optical sheet 240 may include various sheets to improve luminance and uniformity of luminance. For example, the optical sheet 240 may include a diffuser film 241, a first prism film 242, a second prism film 243, and a reflective polarizing film 244.

The diffuser film 241 diffuses light to improve uniformity of luminance. Light emitted from the light sources 211 is diffused by the waveguide plate 220 and further diffused by the diffuser film 241 included in the optical sheet 240.

Light passing through the diffuser film 241 is diffused in a direction parallel to the diffuser film 241, and thus luminance may be reduced.

The first and second prism films 242 and 243 may focus light diffused by the diffuser film 241 to improve luminance.

The first and second prism films 242 and 243 may have triangular prism patterns, and a plurality of prism patterns are arranged adjacent to each other to form a plurality of bands. In this case, the arrangement direction of the prism patterns of first prism film 242 may be perpendicular to that of the prism patterns of the second prism film 243.

Light passing through the first and second prism films 242 and 243 has a viewing angle of about 70 degrees and luminance thereof may be improved as the light proceeds toward the front of the back light unit 200.

The reflective polarizing film 244, one of the polarizing films, may transmit some light beams incident thereon and reflect the other light beams to improve luminance. For example, the reflective polarizing film 244 may transmit light of a predetermined polarization direction and reflect light of the other directions. A polarization direction of the reflective polarizing film 244 may be the same as that of the first polarizing film 111 as described above. As a result, light passing through the reflective polarizing film 244 may also pass through the first polarizing film 111 included in the image forming unit 110.

Light reflected by the reflective polarizing film 244 is recycled in the back light unit 200, and luminance of the display apparatus 100 may increase by this recycling of light.

The optical sheet 240 is not limited to the sheets or films illustrated in FIG. 5 and may further include various other sheets or films such as a protective sheet.

Figure 7:
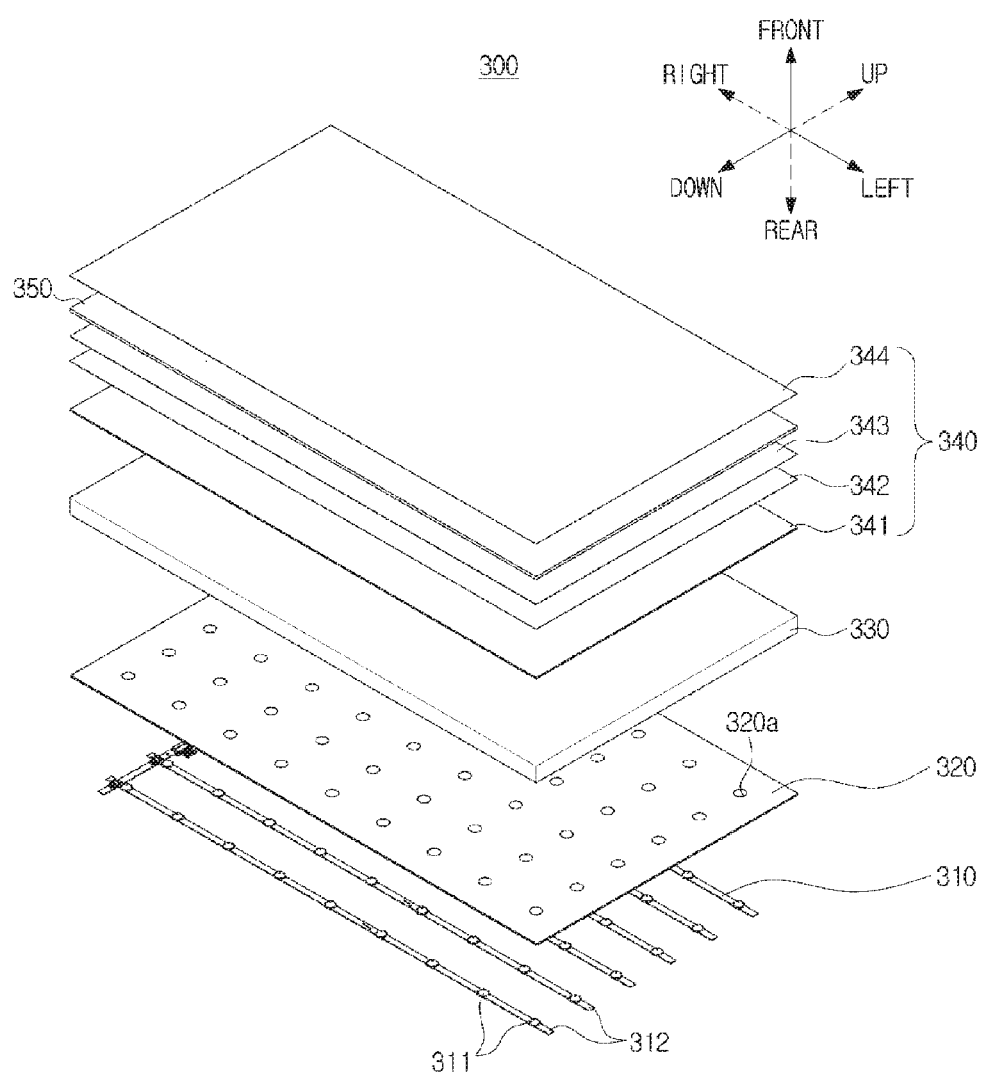
FIG. 7 is an exploded view of a back light unit according to another exemplary embodiment.
Figure 8:
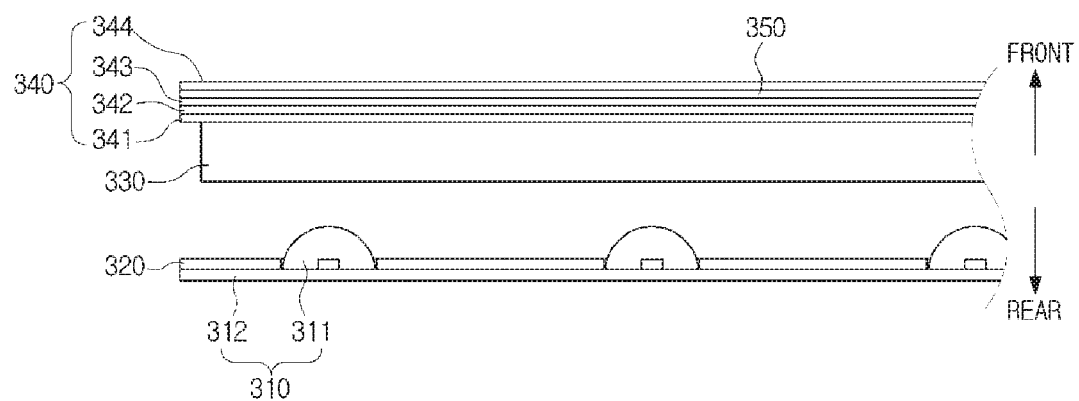
FIG. 8 is a side cross-sectional view of a back light unit according to another exemplary embodiment.

FIG. 7 is an exploded view of a back light unit according to another exemplary embodiment, and FIG. 8 is a side cross-sectional view of the back light unit.

Referring to FIGS. 7 and 8, a direct-type back light unit 300 includes a light emitting module 310 configured to generate light, a reflection sheet 320 configured reflect light, a diffuser plate 330 configured to distribute light, and an optical sheet 340 configured to improve luminance.

The light emitting module 310 may include a plurality of light sources 311 configured to emit light and a support 312 configured to support and fix the plurality of light sources 311.

The plurality of light sources 311 may be arranged at regular intervals at the rear of the back light unit 300 as illustrated in FIG. 7 for emitting light forward.

The plurality of light sources 311 may be arranged in a predetermined pattern to obtain uniform luminance of the emitted light. The plurality of light sources 311 may be arranged at equal intervals. For example, the plurality of light sources 311 may be arranged in rows and columns such that four adjacent light sources form a square as illustrated in FIG. 7. However, the pattern in which the plurality of light sources 311 are arranged is not limited thereto, and the plurality of light sources 311 may be arranged in various patterns to obtain uniform luminance of the emitted light 311.

The light source 311 may include a device capable of emitting monochromatic light (light of one color, for example, blue light) or white light (combination of various wavelengths) in various directions upon receiving power.

The support 312 may fix the plurality of light sources 311 to prevent dislocation of the light sources 311. Furthermore, the support 312 may supply power to each of the light sources 311 to emit light.

Also, a plurality of supports 312 may be provided in accordance with the arrangement of the plurality of light sources 311. For example, when the plurality of light sources 311 are aligned in rows as illustrated in FIG. 7, the number of supports 312 may be the same as the number of rows of the plurality of light sources 311, and each of the supports 312 may fix the light sources 311 in each row. The support 312 may be formed of a synthetic resin provided with conductive power supply lines, or a printed circuit board (PCB) to fix the plurality of light sources 311 and supply power to the light sources 311.

The reflection sheet 320 may be disposed in front of the light emitting module 310 to reflect the light emitted backward to proceed forward.

The reflection sheet 320 has a plurality of through-holes 320a at positions corresponding to the plurality of light sources 311. The light sources 311 may penetrate the through-holes 320a and protrude forward from the reflection sheet 320 as illustrated in FIG. 18.

The reflection sheet 320 may be manufactured by coating a highly reflective material on a base material. For example, the reflection sheet 230 may be manufactured by coating a polymer having a high reflectivity on a base material of polyethylene terephthalate (PET), or the like.

The diffuser plate 330 may be disposed in front of the light emitting module 310 and the reflection sheet 320 to uniformly diffuse the light emitted from the light sources 311.

Although the light sources 311 are arranged at equal intervals, luminance may not be uniform depending on positions of the light sources 311. The diffuser plate 330 may diffuse light emitted from the light sources 311 within the diffuser plate 330 to remove non-uniformity of luminance of the light sources 311. In other words, the diffuser plate 330 may receive non-uniform light from the light sources 311 and emit uniform light forward.

The diffuser plate 330 may include poly methyl methacrylate (PMMA), transparent polycarbonate (PC), or the like including a diffusing agent to diffuse light.

The optical sheet 340 may include various sheets to improve luminance and uniformity of luminance. For example, the optical sheet 340 may include a diffuser film 341, a first prism film 342, a second prism film 343, and a reflective polarizing film 344. Description of the optical sheet 340 will be omitted because it is the same as the optical sheet 240 as described above.

The image forming unit according to the disclosed exemplary embodiment includes a light absorption sheet 121 capable of absorbing light of a predetermined wavelength among light incident from the outside of the display apparatus to realize a low reflection display apparatus. Hereinafter, the light absorption sheet 121 is described.

Figure 13:
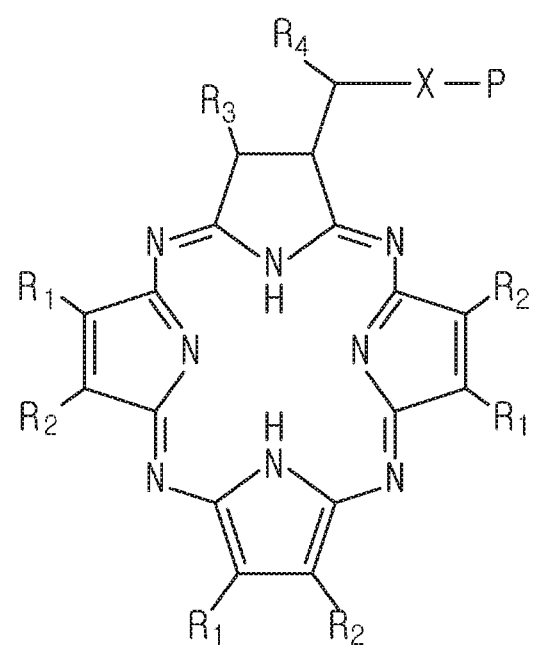
FIG. 13 illustrates a molecular structure of a light absorption material included in an image forming unit according to an exemplary embodiment.
Figure 14:
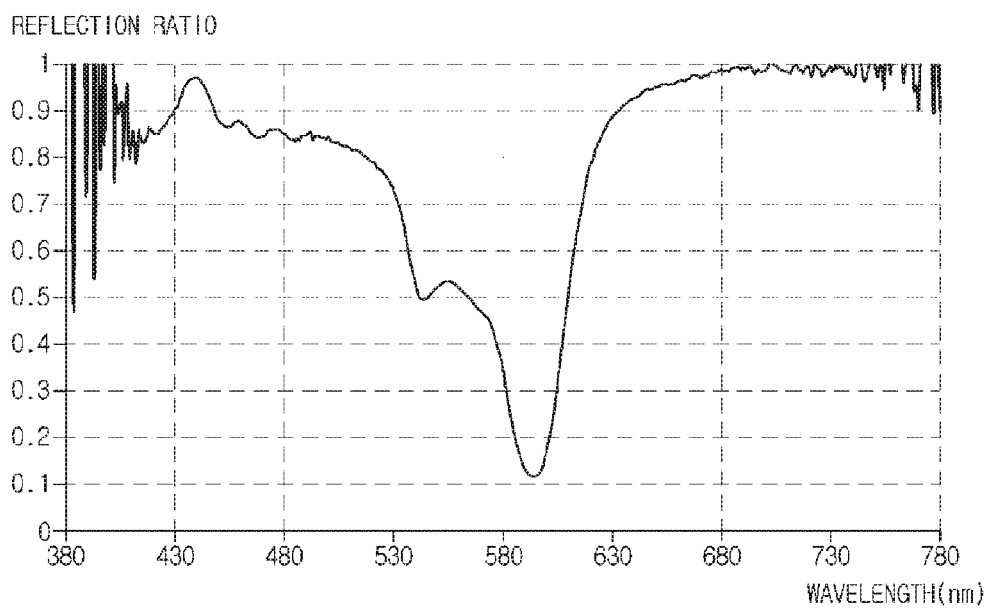
FIG. 14 is a graph illustrating a spectrum of light reflected by a light absorption sheet included in an image forming unit according to an exemplary embodiment.

FIG. 9 to FIG. 12 are side cross-sectional views of the image forming unit according to an exemplary embodiment. FIG. 13 illustrates a molecular structure of a light absorption material included in the image forming unit. FIG. 14 is a graph illustrating a spectrum of light reflected by the light absorption sheet included in the image forming unit.

If the light incident from the outside of the display apparatus is reflected on the screen, the viewer may see on the screen not only the image displayed on the screen but also an image reflected on the screen of the reflected light. This phenomenon is conspicuous in the area where the black color is displayed. Such reflected light interferes with the viewer watching the display apparatus. The light absorption sheet 121 according to the disclosed exemplary embodiment may realize a low reflection display apparatus by absorbing yellow light or orange light which is sensitive to a person in the visible light region of the reflected light.

Figure 9:
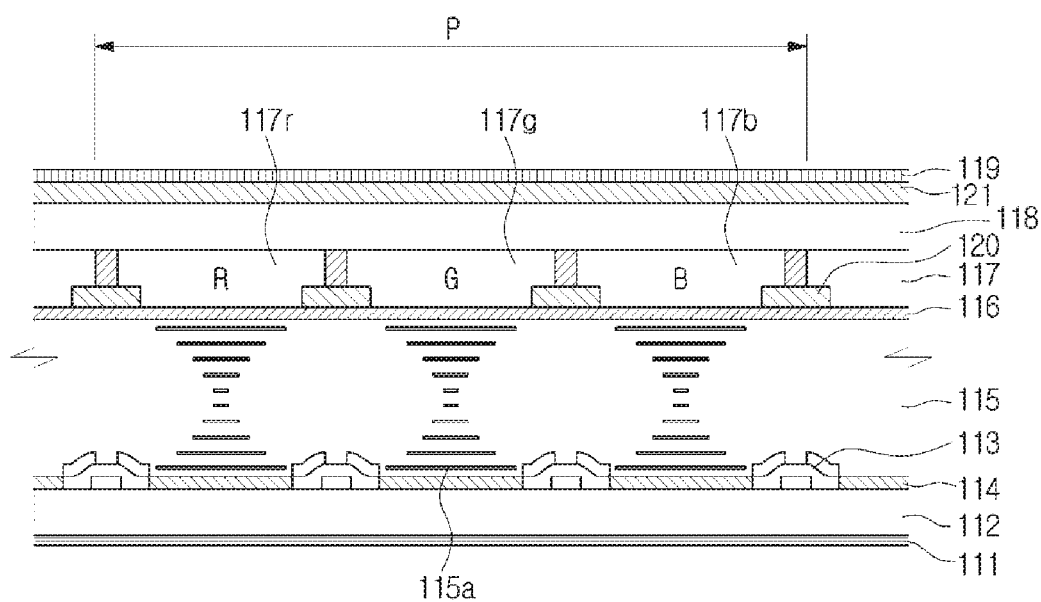
FIG. 9 to FIG. 12 are side cross-sectional views of an image forming unit according to an exemplary embodiment.

As illustrated in FIG. 9, the light absorption sheet 121 may be disposed on the front surface of the liquid crystal panel between the liquid crystal panel and the second polarizing film.

The light absorption sheet 121 may selectively absorb yellow light or orange light. For example, the light absorption sheet 121 may include a light absorption material 251a capable of selectively absorbing light having a wavelength ranging from 530 nm to 630 nm. The light absorption material 251a is capable of absorbing significantly more light having wavelengths ranging from about 570 nm to about 610 nm among light having wavelengths ranging from 530 nm to 630 nm.

Examples of the light absorption material 251a may include Tetra-Aza-Porphyrin (TAP) well known in the art as porphyrazine.

TAP is a tetrapyrrole macrocycle similar to porphyrin and phthalocyanine. Particularly, TAP has a cyclic structure including 8 nitrogen atoms (N) and four pairs of bases R1 and R2, a plurality of carbon atoms (C), and hydrogen atoms (H). Also, TAP is well known as a substance absorbing ultraviolet light, red light, and near-infrared light. Particularly, TAP may absorb light having wavelengths of about 300 nm to about 400 nm and light having wavelengths of about 600 nm or higher.

Optical properties of TAP may be changed by replacing one of the four pairs of basses R1 and R2 with a metal atom (X) and a phosphorus atom (P) as illustrated in FIG. 13. Particularly, TAP may absorb light having wavelength in the range of about 530 nm to about 630 nm far more than the other wavelengths of light.

For example, if the metal atom (X) includes at least one of copper (Cu), chromium (Cr), vanadium (V), and molybdenum (Mo), TAP may absorb light having wavelengths in the range of about 530 nm to about 630 nm far more than the other wavelengths of light. TAP may absorb light having a designated wavelength far more than the other wavelengths of light by using an additional function group in addition to the metal atom (X).

Light having wavelengths of 530 nm to 630 nm may be yellow light and orange light. TAP may absorb yellow light and orange light more by using at least one of Cu, Cr, V, and Mo for the metal atom.

In addition, since TAP does not absorb or partially absorbs light having a wavelength out of the above range. Thus, light having a wavelength out of the range of about 530 nm to about 630 nm may not be absorbed by TAP but pass through TAP.

The light absorption sheet 121 including the TAP may have a light reflection ratio RR as illustrated in FIG. 14.

Referring to FIG. 14, the light absorption sheet 121 has a low light reflection ratio RR in a wavelength range of about 530 nm to about 630 nm and a significantly low light reflection ratio RR in the wavelength range of about 570 nm to about 610 nm in particular.

In the other wavelengths than the wavelength range of about 530 nm to about 630 nm, the light absorption sheet 121 has a light reflection ratio RR of about 90% or more. In the wavelength range of about 530 nm to about 630 nm, the light reflection ratio RR of the light absorption sheet 121 may be sharply reduced to about 10% at a wavelength of about 590 nm.

The fact that the light reflection ratio in the wavelength range of about 530 nm to about 630 nm is lower than the light reflection ratio in the other wavelengths than the wavelength range of about 530 nm to about 630 nm indicates that the light absorption sheet 121 selectively absorbs light having the wavelengths in the range of about 530 nm to about 630 nm.

In other words, while the light is reflected from the light absorption sheet 121, the light absorption sheet 121 may selectively absorb light having the wavelength in the range of about 530 nm to about 630 nm among the incident light. The intensity of light reflected from the light absorption sheet 121 may be reduced by an amount of light absorbed by the light absorption sheet 121 for the wavelengths in the range of about 530 nm to about 630 nm.

The light reflection ratio RR illustrated in FIG. 14 is an example of the light reflection ratio RR of the light absorption sheet 121. The light reflection ratio RR of the light absorption sheet 121 is not limited to the light reflection ratio RR illustrated in FIG. 14.

For example, the minimum point of the light reflection ratio RR of the light absorption sheet 121 is not limited to the wavelength of 590 nm. That is, the minimum point of the light reflection ratio RR of the light absorption sheet 121 may be at an arbitrary wavelength within the range of 530 nm to 630 nm corresponding to yellow light or orange light.

Also, the minimum value of the light reflection ratio RR of the light absorption sheet 121 is not limited to 10%. That is, the minimum value of the light reflection ratio RR of the light absorption sheet 121 may be greater than or smaller than 10%.

As illustrated in FIG. 9, The light absorption sheet 121 is disposed on the front surface of the liquid crystal panel to selectively absorb light in the wavelength range among the light incident on the display apparatus and reflect light in the other wavelength range to reduce the reflection ratio. The light absorption sheet 121 disposed on the front surface of the liquid crystal panel does not include the light absorption material of the same concentration throughout the entire area of the light absorption sheet 121 but may include a light absorption material having a higher concentration in a region corresponding to the black matrix 120 of the color filter 117 than in the other regions.

To enhance color reproduction of the display apparatus 100, color pixel (R, G, and B) should emit light of colors close to primary colors (red, green, and blue).

The color pixels (R, G, and B) may emit light of colors close to the primary colors (red, green, and blue), if the red filter 117*r*, the green filter 117*g*, and the blue filter 117*b* included in the color filter 117 transmit only red light, green light, and blue light, respectively.

In general, however, the color filter 117 transmits light having wavelengths around those of red light, green light and blue light along with the red, green, and blue light. For example, the red filter 117*r* transmits orange light having a similar wavelength to that of red light along with red light, the green filter 117*g* transmits yellow light having a similar wavelength to that of green light along with green light.

As described above, since the color filter 117 transmits yellow light or orange light together with red light, green light and blue light, yellow light or orange light may be output through the green pixel G or the red pixel R. As a result, the color reproduction of the display apparatus 100 is reduced.

The light absorption sheet 121 may enhance the color reproduction of the display apparatus 100 by absorbing yellow light or orange light as described above among the light transmitted through the color filter 117.

Figure 10:
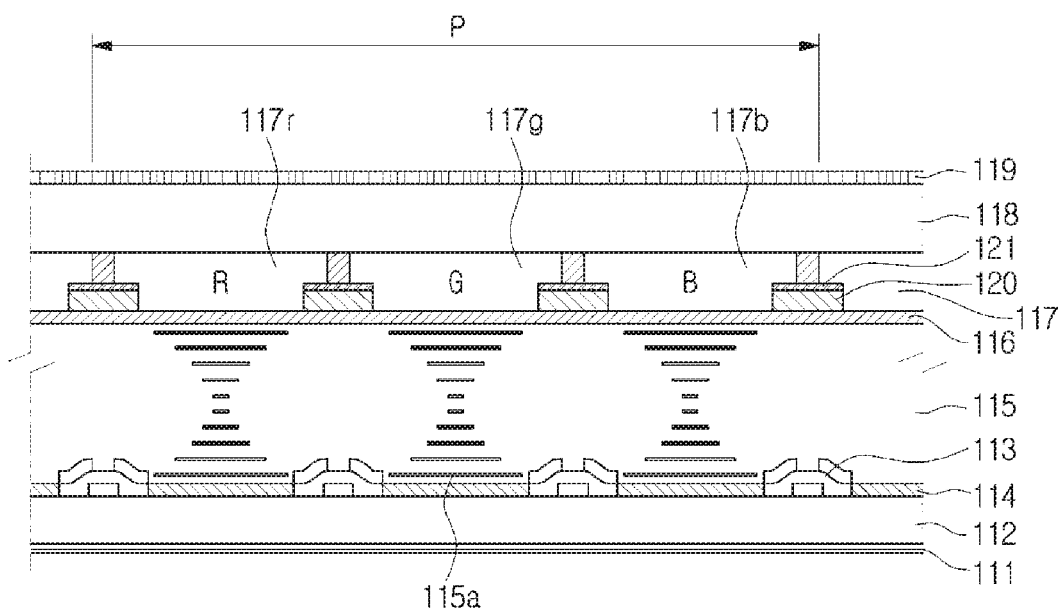

In another exemplary embodiment, the light absorption sheet 121 may be disposed on the front surface of the black matrix 120 of the color filter 117, as illustrated in FIG. 10. The position of the light absorption sheet 121 is not limited to the front surface of the black matrix 120. The light absorption sheet 121 may be disposed on the side surface or the rear surface of the color filter 117 as well as on the front surface of the color filter 117. In another exemplary embodiment, as illustrated in FIG. 11, The light absorption sheet 121 is disposed on the front surface of the liquid crystal panel at a position corresponding to the black matrix 120 of the color filter 117 rather than in the entire area of the front surface of the liquid crystal panel.

Figure 11:
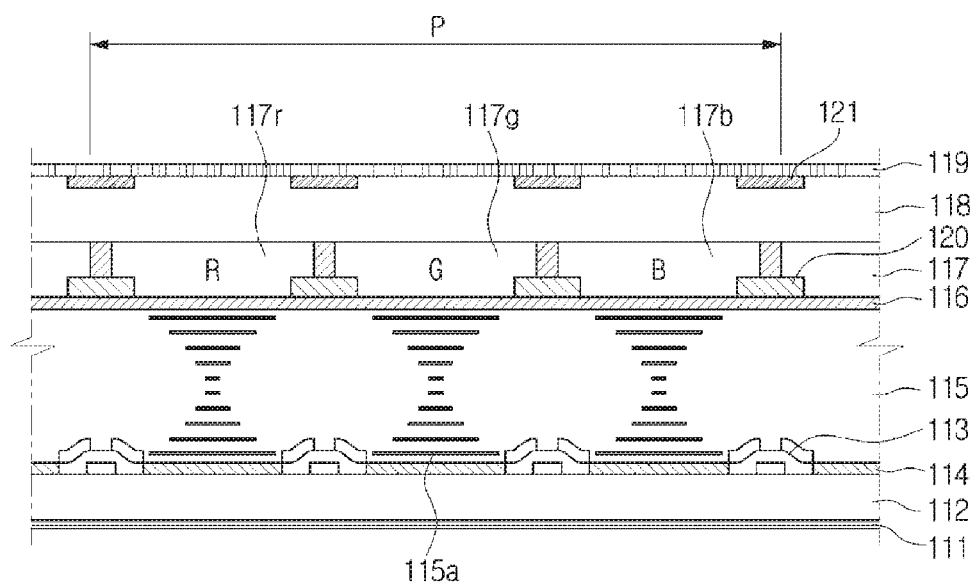

If a light absorption sheet 121 is disposed on the black matrix 120 disposed between the red filter 117*r*, the green filter 117*g* and the blue filter 117*b* included in the color filter 117, or disposed at a position corresponding to the black matrix 120 in the front surface of the liquid crystal panel as illustrated in FIG. 10 and FIG. 11, the light absorption sheet 121 may not be much involved in the absorption of the light transmitted through the red filter 117*r*, the green filter 117*g* and the blue filter 117*b* of the color filter 117 as compared with the case where the light absorption sheet 121 is disposed in the entire area of the liquid crystal panel, but may reduce light reflection ratio by absorbing the aforementioned wavelength range of external light.

Figure 12:
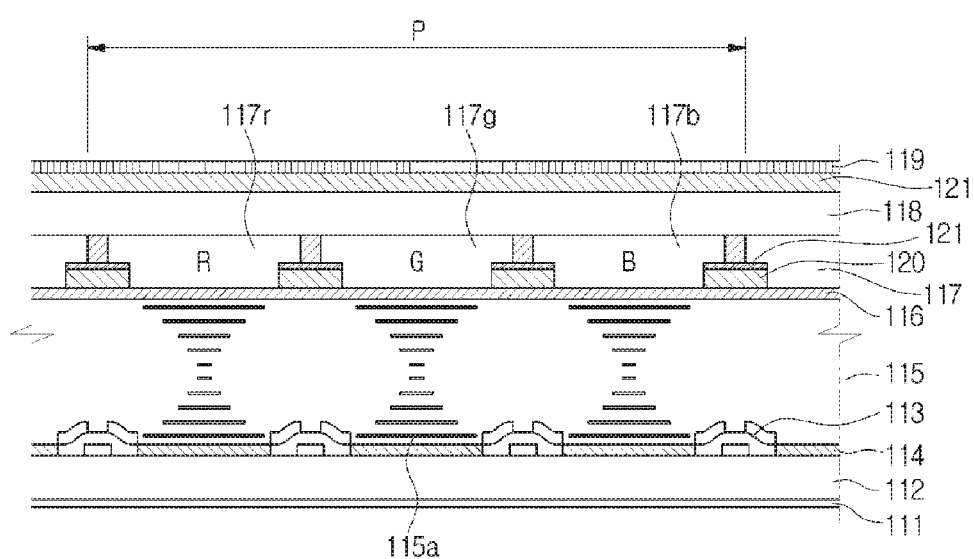

In another exemplary embodiment, the light absorption sheet 121 may be disposed on the black matrix 120 of the color filter 117 and on the front surface of the liquid crystal panel, as illustrated in FIG. 12. Light having a wavelength in the range of about 530 nm to about 630 nm among the light transmitted through the light absorption sheet 121 on the front surface of the liquid crystal panel may be absorbed by the light absorption sheet 121 disposed on the black matrix 120. Thus, the intensity of the light having the wavelength in the range of about 530 nm to about 630 nm may be further reduced. Alternatively, the light absorption sheet 121 provided on the front surface of the liquid crystal panel does not include the light absorbing material of the same concentration throughout the entire area of the light absorption sheet 121 but may include a light absorbing material having a higher concentration in a region corresponding to the black matrix 120 than in the other regions.

The light absorption material 251*a* may be deteriorated by light or heat and thereby lose its functions. In this case, moisture and/or oxygen may serve as a catalyst for deterioration of the light absorption material 251*a* by light or heat. In other words, the light absorption material 251*a* may be deteriorated more quickly by moisture and/or oxygen.

The light absorption sheet 121 according to various exemplary embodiments as described above may include a ultraviolet blocking material and/or an infrared blocking material that block the transmission of ultraviolet rays or infrared rays. The ultraviolet blocking material may absorb or reflect ultraviolet rays, and the infrared blocking material may absorb or reflect infrared rays. The ultraviolet blocking material and/or the infrared blocking material may be embodied as a separate sheet or film and included in the light absorption sheet 121.

The light absorption material 251a, which is an organic material, may be deteriorated by light or heat and lose its function. The light absorption sheet 121 may include an ultraviolet blocking material and/or an infrared blocking material that block high energy ultraviolet rays and/or infrared rays that generate heat energy to prevent deterioration.

The light absorption sheet 121 may include a barrier film so as to block passage of foreign substances such as moisture and/or oxygen. The barrier films may include a polyvinylidene chloride (PVDC) film, an ethylene vinyl alcohol (EVOH) film, or the like to block moisture and/or oxygen. Also, the barrier films 254 and 255 may be manufactured by laminating a polyethylene (PE) film on an EVOH film, or laminating a PE film or polypropylene (PP) film on a polyethylene terephthalate (PET) film.

The barrier film may be disposed on the outer surface of the light absorption sheet 121, and as a result, the light absorption sheet 121 may be prevented from being exposed to moisture and/or oxygen.

The display apparatus according to the various exemplary embodiments described above may improve the color reproduction and prevent disturbance in watching the display apparatus due to the reflection of external light.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A display apparatus comprising:
a backlight;
a liquid crystal panel configured to selectively block light emitted from the backlight, the liquid crystal panel comprising a liquid crystal layer and a black matrix disposed on the liquid crystal layer; and
a light absorption sheet disposed on a front side of the liquid crystal panel and comprising an absorption material configured to absorb light having a predetermined range of wavelength, the light absorption sheet comprising a higher concentration of the absorption material in a portion corresponding to the black matrix than in other portions,
wherein the black matrix is interposed between the portion and the liquid crystal layer.

2. The display apparatus according to claim 1, wherein the predetermined range of wavelength corresponds to yellow light or orange light.

3. The display apparatus according to claim 1, wherein the light absorption sheet comprises tetra-aza-porphyrin (TAP), and
wherein the predetermined range of wavelength is 530 nm to 630 nm.

4. The display apparatus according to claim 1, further comprising a first polarizing film disposed on a front side of the light absorption sheet.

5. The display apparatus according to claim 1, further comprising a second polarizing film disposed on a rear side of the liquid crystal panel, upon which the light emitted from the backlight is incident.

6. The display apparatus according to claim 1, further comprising a transparent substrate interposed between the black matrix and the light absorption sheet.

7. The display apparatus according to claim 1, wherein the liquid crystal panel comprises:
a color filter disposed on a front side of the liquid crystal layer, and comprising a red filter, a green filter, a blue filter, and the black matrix,
wherein the black matrix is interposed between the red filter, the green filter, and the blue filter.

8. The display apparatus according to claim 7, wherein the light absorption sheet is disposed on at least one side of the black matrix.

9. The display apparatus according to claim 7, wherein the light absorption sheet is disposed at a position corresponding to the black matrix on the front side of the liquid crystal panel.

10. The display apparatus according to claim 7, wherein the absorption material comprises tetra-aza-porphyrin (TAP).

11. A display apparatus comprising:
a backlight; and
a liquid crystal panel configured to selectively block light emitted from the backlight,
wherein the liquid crystal panel comprises:
a color filter comprising a red filter, a green filter, a blue filter, and a black matrix interposed between the red filter, the green filter, and the blue filter; and
a light absorption sheet disposed on the black matrix and comprising an absorption material configured to absorb light having a predetermined range of wavelength, the light absorption sheet comprising a higher concentration of the absorption material in a portion corresponding to the black matrix than in other portions,
wherein the black matrix is interposed between the portion and the backlight.

12. The display apparatus according to claim 11, wherein the predetermined range of wavelength corresponds to yellow light or orange light.

13. The display apparatus according to claim 11, wherein the absorption material comprises tetra-aza-porphyrin (TAP), and
wherein the predetermined range of wavelength is 530 nm to 630 nm.

14. The display apparatus according to claim 11, further comprising a first polarizing film disposed on a front side of the liquid crystal panel.

15. The display apparatus according to claim 11, further comprising a second polarizing film disposed on a rear side of the liquid crystal panel, upon which the light emitted from the backlight is incident.

16. The display apparatus according to claim 11, further comprising a transparent substrate interposed between the black matrix and the light absorption sheet.

17. The display apparatus according to claim 11, wherein the light absorption sheet is disposed on the black matrix, the red filter, the green filter and the blue filter.

18. The display apparatus according to claim 11, wherein the light absorption sheet is disposed on a front side of the liquid crystal panel.

19. The display apparatus according to claim 18, wherein the light absorption sheet is disposed at a position corresponding to the black matrix on the front side of the liquid crystal panel.

20. The display apparatus according to claim 18, wherein the absorption material comprises tetra-aza-porphyrin (TAP).

* * * * *